United States Patent
Hessler et al.

(10) Patent No.: US 11,233,592 B2
(45) Date of Patent: Jan. 25, 2022

(54) SYSTEMS AND METHODS FOR HANDLING NON-TYPICAL INTERFERENCE IN WIRELESS COMMUNICATIONS NETWORKS

(71) Applicant: Telefonaktiebolaget LM Ericsson (publ), Stockholm (SE)

(72) Inventors: Martin Hessler, Linköping (SE); Svante Bergman, Hägersten (SE); Jonas Fröberg Olsson, Ljungsbro (SE); Eleftherios Karipidis, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 48 days.

(21) Appl. No.: 16/347,562

(22) PCT Filed: Oct. 31, 2017

(86) PCT No.: PCT/SE2017/051071
§ 371 (c)(1),
(2) Date: May 3, 2019

(87) PCT Pub. No.: WO2018/084782
PCT Pub. Date: May 11, 2018

(65) Prior Publication Data
US 2019/0296838 A1    Sep. 26, 2019

Related U.S. Application Data

(60) Provisional application No. 62/417,941, filed on Nov. 4, 2016.

(51) Int. Cl.
*H04W 36/00*    (2009.01)
*H04W 24/10*    (2009.01)
(Continued)

(52) U.S. Cl.
CPC ......... *H04B 17/336* (2015.01); *H04B 17/345* (2015.01); *H04L 1/0026* (2013.01);
(Continued)

(58) Field of Classification Search
CPC ..... H04L 5/0035; H04L 5/006; H04L 5/0073; H04W 24/10; H04W 36/30; H04W 36/0072; H04W 72/082; H04W 72/1231
See application file for complete search history.

(56) References Cited

U.S. PATENT DOCUMENTS

| | | | |
|---|---|---|---|
| 9,456,372 B2 * | 9/2016 | Lee | H04B 7/0626 |
| 2006/0056346 A1 * | 3/2006 | Vadgama | H04W 72/1278 370/329 |

(Continued)

FOREIGN PATENT DOCUMENTS

| | | |
|---|---|---|
| EP | 2897406 A1 | 7/2015 |
| EP | 2947942 A1 | 11/2015 |

(Continued)

OTHER PUBLICATIONS

International Search Report and Written Opinion of the International Searching Authority, PCT/SE2017/051071 dated Jan. 23, 2018, 12 pages.

(Continued)

*Primary Examiner* — Romani Ohri
(74) *Attorney, Agent, or Firm* — Christopher & Weisberg, P.A.

(57) ABSTRACT

A method of operating a UE includes obtaining an interference measurement (IM) resource, performing an interference measurement using the IM resource, obtaining a time reference associated with the interference measurement, determining that the interference measurement represents a non-typical level of interference, and transmitting an indicator indicating the time reference to a network node.

(Continued)

Scenario with a C-MTC wireless device interfered by beam-formed transmission

Related nodes, devices and computer program products are disclosed.

16 Claims, 9 Drawing Sheets

(51) Int. Cl.
| | | |
|---|---|---|
| *H04B 17/336* | (2015.01) | |
| *H04L 1/00* | (2006.01) | |
| *H04L 1/20* | (2006.01) | |
| *H04L 5/00* | (2006.01) | |
| *H04W 36/20* | (2009.01) | |
| *H04W 72/08* | (2009.01) | |
| *H04B 17/345* | (2015.01) | |

(52) U.S. Cl.
CPC ............ *H04L 1/203* (2013.01); *H04L 5/0051* (2013.01); *H04W 24/10* (2013.01); *H04W 36/20* (2013.01); *H04W 72/082* (2013.01)

(56) References Cited

U.S. PATENT DOCUMENTS

| | | | | |
|---|---|---|---|---|
| 2006/0269023 A1* | 11/2006 | Chimitt | ................ | H04B 1/1036 375/350 |
| 2012/0108194 A1* | 5/2012 | Lindqvist | ............. | H04B 7/0871 455/296 |
| 2013/0102256 A1* | 4/2013 | Cendrillon | ........... | H04B 7/0854 455/63.4 |
| 2013/0260763 A1 | 10/2013 | Bhattad et al. | | |
| 2013/0286867 A1* | 10/2013 | Davydov | ............... | H04W 24/08 370/252 |
| 2014/0126402 A1 | 5/2014 | Nam et al. | | |
| 2014/0269460 A1* | 9/2014 | Papasakellariou | .... | H04L 5/0053 370/294 |
| 2014/0369269 A1* | 12/2014 | Farkas | .................. | H04W 24/02 370/329 |
| 2016/0021693 A1* | 1/2016 | Doetsch | .............. | H04W 72/042 370/329 |
| 2016/0278077 A1 | 9/2016 | Song et al. | | |
| 2018/0063736 A1* | 3/2018 | Sadeghi | ................ | H04W 24/10 |
| 2018/0206140 A1* | 7/2018 | Panteleev | ............ | H04W 72/044 |
| 2018/0262251 A1* | 9/2018 | Kim | ...................... | H04B 7/0465 |
| 2018/0323848 A1* | 11/2018 | Mizusawa | ............. | H04W 16/28 |
| 2019/0074883 A1* | 3/2019 | Park | ...................... | H04L 5/0057 |

FOREIGN PATENT DOCUMENTS

| | | |
|---|---|---|
| WO | WO 2014/182541 A2 | 11/2014 |
| WO | WO 2017/061822 A1 | 4/2017 |

OTHER PUBLICATIONS

Huawei, HiSilicon; 3GPP TSG RAN WG1 Meeting #82bis, R1-155956, Discussion of CSI-RS measurement restriction; Malmo, Sweden, Oct. 5-9, 2015, 3 pages.

Extended European Search Report dated May 28, 2020 for European Patent Application No. 17867478.4, 8 pages.

\* cited by examiner

Scenario with a C-MTC wireless device interfered by beam-formed transmission

| NODE | TTI 0 | TTI 1 | TTI 2 | TTI 3 | TTI 4 | TTI 5 | TTI 6 | Report |
|---|---|---|---|---|---|---|---|---|
| BS A | DL A1,4,6 | DL A2,3,5,7 | UL A1,3,4 | DL A1,2,4,6 | DL A1,3,5,1 | UL A1,3,4,5 | DL A1,4,6 | |
| BS B | DL B3,6,7 | DL B1,7,9 | UL B1,6,7 | DL B1,6,8 | DL B2,6,7 | UL B3,6,7 | DL B3,6,7 | |
| UE A1 | | ✓ | | ✓ | | | | T=1,3 |

Figure 6A

| NODE | TTI 0 | TTI 1 | TTI 2 | TTI 3 | TTI 4 | TTI 5 | TTI 6 | Report |
|---|---|---|---|---|---|---|---|---|
| BS A | DL A1,4,6 | DL A2,3,5,7 | UL A1,3,4 | DL A1,2,4,6 | DL A1,3,5,1 | UL A1,3,4,5 | DL A1,4,6 | |
| BS B | DL B3,6,7 | UL B1,7,9 | DL B1,6,7 | UL B1,6,8 | DL B1,6,7 | UL B3,6,7 | DL B3,6,7 | |
| UE A1 | | ✓ | | ✓ | | | | T=1,3 |

Figure 6B

SYSTEMS AND METHODS FOR HANDLING NON-TYPICAL INTERFERENCE IN WIRELESS COMMUNICATIONS NETWORKS

CROSS REFERENCE TO RELATED APPLICATIONS

This application is a 35 U.S.C. § 371 national stage application of PCT International Application No. PCT/SE2017/051071 filed on Oct. 31, 2017, which in turn claims domestic priority to U.S. Provisional Patent Application No. 62/417,941 filed on Nov. 4, 2016, the disclosures and content of which are incorporated by reference herein in their entirety.

TECHNICAL FIELD

The present disclosure relates to methods and operations by network nodes and user equipments in wireless communication networks.

BACKGROUND

In many wireless communications systems, CSI (Channel State Information) feedback is important for obtaining good performance. Reference signals, which are used to estimate the channel state, are transmitted periodically by a transmitting node. A receiving node reports CSI feedback information in response to the reference signals. The reported CSI feedback typically includes CQI (Channel-Quality Indicator), RI (Rank Indicator), and/or PMI (Pre-coding Matrix Indicator) values.

The 3GPP LTE (Long Term Evolution) system supports CSI-reporting schemes that rely on the reference symbols being transmitted periodically. In particular, cell-specific reference symbols (CRS) are sent every subframe, while the user-specific CSI Reference Symbol (CSI-RS) can be sent with a larger periodicity. User Equipment (UE) devices using transmission mode 10 (TM10) rely solely on CSI-RS resources, while other UEs typically use the CRS at least for interference measurements.

TM10 UEs can be configured to report CSI for multiple CSI processes, each of which may have different CSI measurement resources. A CSI measurement resource (CSI-MR) consists of a CSI-RS resource and a CSI-IM (CSI Interference Measurement) resource. Both the CSI-RS and the CSI-IM resources include time-frequency resources that are divided into sets of resources, where each set is identified by CSI-RS configuration index. Each CSI-RS/IM configuration index indicates resources in every Physical Resource Block (PRB) in the frequency band. A subframe configuration specifies a subframe periodicity and a subframe offset that specify for the UE at which time instances the respective measurement resources are available.

Time filtering/averaging of interference is sometimes desirable when the interference variations are unknown to the node serving the UE while it may be less desirable when the variations can be predicted by the node serving the UE. To improve performance of coordination features, it is possible to configure the UE not to time filter/average the interference estimated on the CSI-IM resource. This means that the reported CSI will reflect the momentary quality of the channel.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

A method of operating a UE according to some embodiments includes obtaining an interference measurement (IM) resource, performing an interference measurement using the IM resource, obtaining a time reference associated with the interference measurement, determining that the interference measurement represents a non-typical level of interference, and transmitting an indicator indicating the time reference to a network node.

The IM resource may include a channel state information interference measurement (CSI-IM) resource. In some embodiments, the IM resource may include a zero power (ZP) CSI-RS resource.

The IM resource may include a demodulation reference signal, DMRS, resource.

The time reference may include a transmission time interval associated with the interference measurement.

The method may further include transmitting an indicator indicating a difference between the non-typical level of interference and a typical level of interference to the network node.

The non-typical level of interference may include interference associated with a metric that is compared to a threshold.

The metric may include a signal to interference ratio (SIR), a signal to interference plus noise ratio (SINR) and/or a bit error rate (BER).

The non-typical level of interference may include interference greater than an average level of interference.

The method may further include measuring interference using the IM resource in a plurality of subframes, generating a list indicating subframes in the plurality of subframes in which non-typical levels of interference were measured, and transmitting the list to the network node.

The list may include a bit-map that indicates subframes in the plurality of subframes in which non-typical levels of interference were measured.

The method may further include detecting multiple occurrences of non-typical interference, generating a covariance matrix for the multiple occurrences of non-typical interference, and analyzing the covariance matrix to determine if the multiple occurrences of non-typical interference are spatially correlated. Transmitting the indicator may include transmitting a second indicator to the network node indicating that the multiple occurrences of non-typical interference are spatially correlated.

Some embodiments provide a computer program product including a non-transitory computer readable medium storing program code that when executed by a processor of the UE causes the UE to perform operations of the foregoing methods.

Some embodiments provide a UE adapted to perform of the foregoing methods.

A UE according to some embodiments includes a transceiver, at least one processor coupled to the transceiver, and at least one memory coupled to the at least one processor and storing program code that when executed by the at least one processor causes the at least one processor to perform operations including: obtaining an interference measurement (IM) resource, performing an interference measurement using the IM resource, obtaining a time reference associated with the interference measurement, determining that the interference measurement represents a non-typical level of interference, and transmitting an indicator indicating the time reference to a network node.

A UE according to further embodiments includes an interference measurement module for obtaining an interference measurement (IM) resource and performing an interference measurement using the IM resource, a time reference obtaining module for obtaining a time reference associated with the interference measurement, an interference evaluation module for determining that the interference measurement represents a non-typical level of interference, and a notification transmitting module for transmitting an indicator indicating the time reference to a network node.

A method of operating a network node of a cellular radio access network, RAN, according to some embodiments includes receiving a notification of non-typical interference experienced by a user equipment (UE), determining a time reference associated with the non-typical interference, and coordinating with an adjacent network node to reduce a level of the non-typical interference.

Coordinating with the adjacent network node to reduce the level of the non-typical interference may include changing resources allocated to the UE.

The UE may include a first UE, and coordinating with the adjacent network node to reduce a level of the non-typical interference may include changing scheduling of resources allocated to a second UE that is causing the level of the non-typical interference at the first UE.

The method may further include determining that the adjacent network node is transmitting signals that result in the non-typical interference at the UE, and initiating handover of the UE to the adjacent network node.

The UE may include a first UE, the method may further include determining that the adjacent network node is transmitting signals to a second UE that result in the non-typical interference at the first UE, and initiating handover of the second UE away from the adjacent network node.

A computer program product according to some embodiments includes a non-transitory computer readable medium storing program code that when executed by a processor of the network node causes the network node to perform operations of the foregoing methods.

A network node according to some embodiments is adapted to perform the foregoing methods.

A network node according to some embodiments includes a transceiver, at least one processor coupled to the transceiver, and at least one memory coupled to the at least one processor and storing program code that when executed by the at least one processor causes the at least one processor to perform operations including: receiving a notification of non-typical interference experienced by a user equipment (UE), determining a time reference associated with the non-typical interference, and coordinating with an adjacent network node to reduce a level of the non-typical interference.

A network node according to some embodiments includes a notification receiving module for receiving a notification of non-typical interference experienced by a user equipment (UE), a time reference receiving module for determining a time reference associated with the non-typical interference, and a coordination module for coordinating with an adjacent network node to reduce a level of the non-typical interference.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 6A and 6B illustrate operations of systems/methods according to an example;

DETAILED DESCRIPTION

Figure 1:
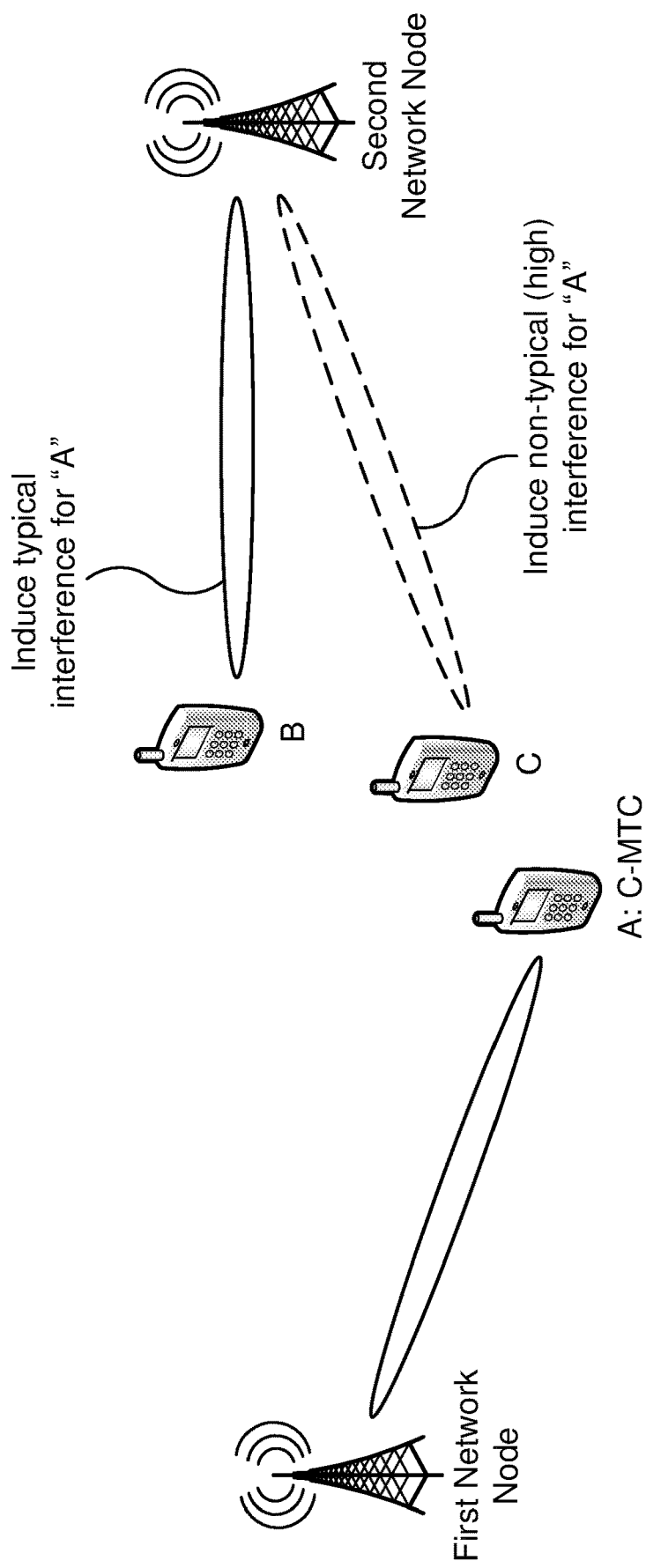
FIG. 1 is a schematic diagram illustrating a communication scenario in an LTE-based radio access network including first and second network nodes.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Terminology

In some embodiments a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, etc. In some cases, a UE may peform the function of a network node.

In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

In some embodiments the non-limiting term WAN (wireless access network or RAN, radio access network) node is used. The WAN node can be a UE or a network node (e.g. access point, BS etc). The WAN node is also interchangeably called as cellular node, NW source node etc.

The term time resource used herein may correspond to any type of physical resource or radio resource expressed in terms of length of time. Examples of time resources are: symbol, time slot, subframe, radio frame, transmission time interval (TTI), interleaving time etc.

The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000, 5G, NR, etc.

Other Solutions

The number of antenna elements used in wireless communication systems, especially on the network side, is expected to increase dramatically. The presence of multiple antenna elements means that a transmission from a network node may be beam-formed towards the receiving wireless node of the transmission. When the transmissions to the wireless devices are beam-formed, the interference levels experienced by a wireless device may be reduced, except for occasional peaks in interference levels when interfering beams become directed towards the wireless device. For Massive-MIMO systems in which CSI acquisition for the channel part is based on reciprocity (UL reference signals) and not downlink CSI reference signals, it is important to have mechanisms to determine the interference levels experienced by the wireless device. Existing mechanisms may not be suitable/optimal for Massive-MIMO for a number of reasons.

First, transmission of downlink CSI reference signals is unnecessary, since the channel is estimated from UL reference signals; only the interference levels are needed to be acquired.

Second, CSI is reported with respect to sampled time-instances both with respect to measurement and reporting. The level of interference (and channel) during the time between the sample instances will be unknown. Hence, the current CSI reporting is designed with the assumption that true channel and interference at a time instance with a small time-difference from a CSI sample occasion will not be worse than can be solved by soft-combining. However, with a large degree of beamforming, this may change.

Third, the use of HARQ-ACK/NACK for interference detection is not ideal. A HARQ NACK may be interpreted as an indication that the interference level is non-typically high. However, a HARQ-ACK/NACK is only present when a transmission has occurred, and therefore using HARQ-ACK/NACK as an indicator for non-typical interference can only be used reactively.

For some critical machine-type communication (C-MTC) traffic, there are tight latency and reliability requirements. The latency requirements may, in some scenarios, limit the use of HARQ transmissions such that the communication to the wireless device has to rely on a single transmission that, in some extreme scenarios, is required to have an error probability as low as $10^{-6}$ or lower. This may be accomplished using a dedicated transmission resource for each such device. For downlink communications, this means that no other network node may be allowed to use the dedicated resource for transmissions to other wireless devices. Clearly, such a design will quickly drain the transmission resources as the number of C-MTC devices increases.

Another solution may be to not use a dedicated resource, but to use conservative link adaptation to mitigate the uncertainties in interference levels. However, this approach would also consume a lot of resources. Moreover, in some environments, there may be frequent interference peaks that induce violations of the reliability requirement.

Overview of Embodiments

Various embodiments of the present disclosure are directed to operations and methods by UEs and network nodes for performing communications.

According to some embodiments, a wireless device is configured with a low overhead interference measurement (IM) resource, potentially present in all TTIs. The wireless device performs measurements on the IM resource and classifies measured interference according to an interference classification method. The IM resource may for example be a zero power (ZP) CSI-RS, a demodulation reference signal (DMRS), or another suitable resource. The wireless device then transmits an indicator to a network node that indicates one or more time references for the non-typical interference level measured on the IM resource. As will be appreciated, a zero-power CSI-RS is a resource on a CSI-RS region where data is not expected. A CSI-IM is a zero-power CSI-RS on which the UE shall perform an interference measurement. A non-zero-power CSI-RS resource is a resource where the UE normally performs channel estimates based on a CSI reference signal transmitted there.

The indicator indicating one or more time references may be transmitted using an existing (i.e., already defined) CSI reporting mode, a new CSI reporting mode, or using higher layer signaling, such as a MAC control element.

An advantage of obtaining a time reference for the non-typical level of interference and transmitting the time reference to a network node is that it enables the network node to efficiently identify which transmissions are causing the non-typical level of interference at the wireless device, so that corrective action can be taken to reduce the level of interference experienced at the wireless device.

In some embodiments, the indicator also indicates a difference value between the non-typical interference level and a typical, average, or expected interference level.

In some embodiments, the non-typical interference is defined as a level of interference at which a critical service would fail to meet an error requirement. In some embodiments, a non-typical interference may be defined as a level of interference above an average interference level on the IM resource. In some embodiments, a non-typical interference level may be defined as a level such that the receiver saturates and is unable to reliably measure interference.

Inventive concepts described herein may provide a low overhead interference measurement mechanism that can identify and/or mitigate interference in some situations. Some embodiments may avoid incurring a large CSI-RS overhead cost associated with performing per-UE measurements to find rare interference situations. Further, some embodiments may enable a low overhead mechanism for identifying handover and coordination opportunities. Some embodiments may increase the observability for critical services (e.g. for C-MTC) without dedicated resources where a large number of statistics are needed to enable a sufficiently low error rate to be obtained. Some embodiments of the inventive concepts may further avoid using dedicated resources for critical services in some cases.

Example Network Scenario

FIG. 1 illustrates an example of a network scenario in which embodiments on the inventive concepts may be employed. As shown in FIG. 1, a first network node serves a C-MTC wireless device A and a second network node serves two wireless devices B and C, which may or may not be C-MTC devices. The network nodes beam-form the transmissions to the served wireless devices. When wireless device B is scheduled, the interference induced at wireless device A is typically low. In contrast, because of their respective geographic locations, when wireless device C is scheduled, the beam-formed transmission may induce non-typically high levels of interference at wireless device A, as illustrated in FIG. 1.

According to some embodiments, the wireless device A may obtain an IM resource and perform interference measurement on the IM resource. The configuration to perform interference measurement may be chosen according to a specification (e.g., always use), based on the type of wireless device (e.g., UE class), and/or in response to radio resource control (RRC) signaling activating the method. The wireless device A uses an interference classification method such that the interference from wireless device B is classified as "typical," while interference from wireless device C is classified as "non-typical."

When wireless device A classifies an interference measurement as non-typical, it obtains a time reference T corresponding the non-typical interference measurement. The wireless device A then transmits an indicator indicating the time reference T to the first network node. Upon reception of the indicator indicating the time reference T, the first network node may determine that the non-typical interference may cause a violation of a reliability requirement for the C-MTC wireless device A. The first network node may initiate coordination with the second node to reduce or avoid interference caused by transmissions to/from the wireless device C. In particular, in some embodiments, the second network node may be informed of the time reference T associated with the non-typical interference. This enables the second node to determine that transmissions to wireless device C are causing the non-typical interference. The first and second node may then agree on a transmission resource (e.g., a time interval) in which the second network node does not transmit to wireless device C. Note that transmissions to the wireless device B are unaffected, and may still induce typical level of interference at wireless device A.

Figure 2:
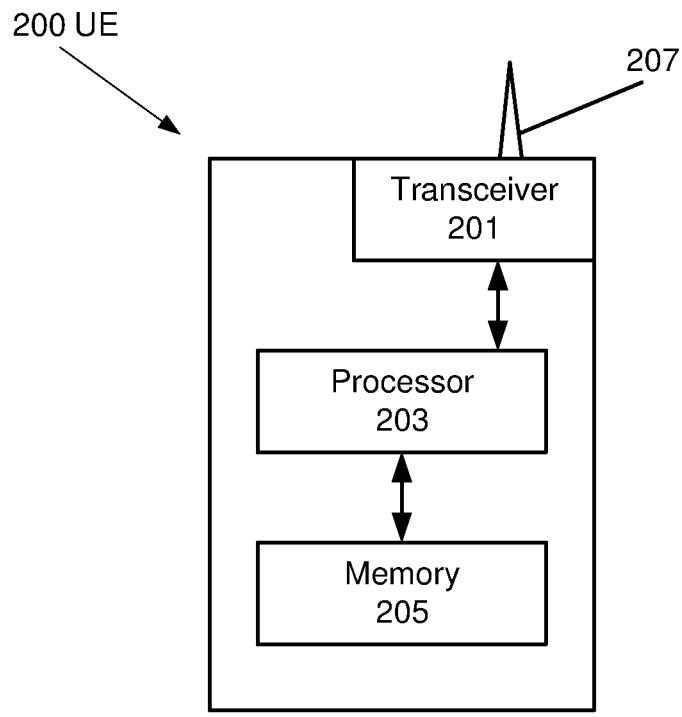
FIG. 2 is a block diagram illustrating a UE according to some embodiments of inventive concepts.

Example Elements of UE and Network Node:

FIG. 2 is a block diagram illustrating elements of a UE 200 (also referred to as a wireless terminal, a wireless communication device, a wireless communication terminal, user equipment, a user equipment node/terminal/device, etc.) configured to provide operations according to embodiments of inventive concepts. As shown, the UE 200 may include an antenna 207, and a transceiver circuit 201 (also referred to as a transceiver) including a transmitter and a receiver configured to provide uplink and downlink radio communications with a base station of a radio access network, and to provide communications with other wireless communication devices. The UE 200 may also include a processor circuit 203 (also referred to as a processor) coupled to the transceiver circuit, and a memory circuit 205 (also referred to as memory) coupled to the processor circuit. The memory circuit 205 may include computer readable program code that when executed by the processor circuit 203 causes the processor circuit to perform operations according to embodiments disclosed herein for a UE. According to other embodiments, processor circuit 203 may be defined to include memory so that a separate memory circuit is not required. The UE 200 may also include an interface (such as a user interface) coupled with processor 203, and/or the UE 200 may be incorporated in a vehicle.

As discussed herein, operations of the UE 200 may be performed by processor 203 and/or transceiver 201. For example, processor 203 may control transceiver 201 to transmit communications through transceiver 201 over a radio interface to another UE and/or to receive communications through transceiver 201 from another UE over a radio interface. Moreover, modules may be stored in memory 205, and these modules may provide instructions so that when instructions of a module are executed by processor 203, processor 203 performs respective operations (e.g., operations discussed below with respect to example embodiments).

Figure 3:
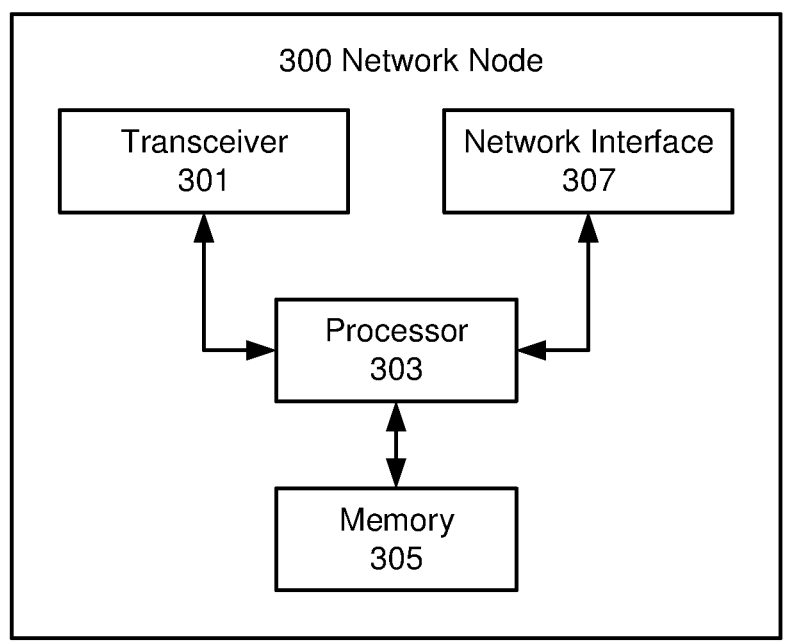
FIG. 3 is a block diagram illustrating a network node of a radio access network (RAN) according to some embodiments of inventive concepts.

FIG. 3 is a block diagram illustrating elements of a network node 300 (also referred to as a node, base station, eNB, eNodeB, etc.) of a Radio Access Network (RAN) configured to provide cellular communication according to embodiments of inventive concepts. As shown, the network node 300 may include a transceiver circuit 301 (also referred to as a transceiver) including a transmitter and a receiver configured to provide uplink and downlink radio communications with UEs. The network node 300 may include a network interface circuit 307 (also referred to as a network interface) configured to provide communications with other nodes (e.g., with other base stations) of the RAN. The network node may also include a processor circuit 303 (also referred to as a processor) coupled to the transceiver circuit, and a memory circuit 305 (also referred to as memory) coupled to the processor circuit. The memory circuit 305 may include computer readable program code that when executed by the processor circuit 303 causes the processor circuit to perform operations according to embodiments disclosed herein. According to other embodiments, processor circuit 303 may be defined to include memory so that a separate memory circuit is not required.

As discussed herein, operations of the network node 300 may be performed by processor 303, network interface 307, and/or transceiver 301. For example, processor 303 may control transceiver 301 to transmit communications through transceiver 301 over a radio interface to one or more UEs and/or to receive communications through transceiver 301 from one or more UEs over a radio interface. Similarly, processor 303 may control network interface 307 to transmit communications through network interface 307 to one or more other network nodes and/or to receive communications through network interface from one or more other network nodes. Moreover, modules may be stored in memory 305, and these modules may provide instructions so that when instructions of a module are executed by processor 303, processor 303 performs respective operations (e.g., operations discussed below with respect to example embodiments of network nodes).

Operations of UEs

Figure 4:
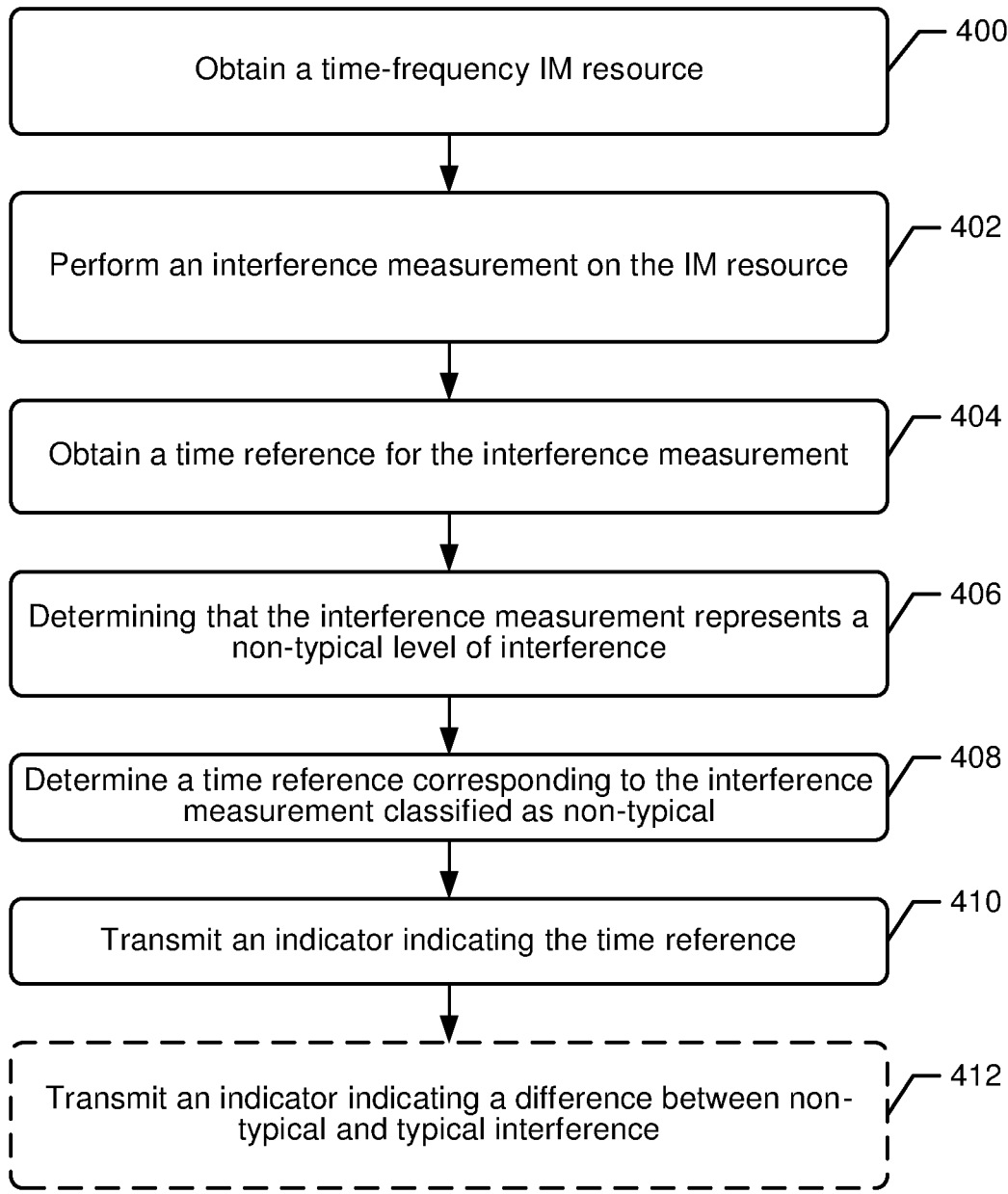
FIG. 4 is a flowchart of operations and methods that can be performed by a UE according to some embodiments of inventive concepts.

FIG. 4 is a flowchart of operations that may be performed by a UE according to some embodiments. Referring to FIG. 4, a UE may first obtain a time-frequency IM resource (Block 400). As noted above, the IM resource may include a CSI-IM resource including time-frequency resources that are divided into sets of resources, where each set is identified by CSI-RS configuration index. The CSI-IM resource may be a zero power CSI-RS. The UE 200 may perform an interference measurement on the IM resource (Block 402). The UE may also obtain or record a time reference associated with the interference measurement (Block 404). For example, the UE 200 may obtain or record a transmission time interval (TTI) in which the interference measurement was made. Other time references could be used, such as a relative time reference that is relative to a designated TTI. Yet other time references may include an absolute or relative reference to a time or subframe, or even an OFDM symbol at which the interference was observed. In some embodiments, the time reference may be a time offset relative to a time when the measurement report is transmitted by the UE.

Referring to block 406, the UE 200 may determine if the interference is typical or non-typical. In particular, the UE may obtain a classifier for typical and non-typical interference measurements. The classifier may, for example, be a threshold value by which typical and non-typical interference can be distinguished, such as a threshold level of a signal to interference ratio (SIR), a signal to interference plus noise ratio (SINR), a bit error rate (BER), or other value. Other methods of distinguishing typical interference from non-typical interference are discussed below.

The UE 200 may optionally determine a time reference corresponding to an interference classified as non-typical (Block 408). Once the UE 200 has identified non-typical interference, the UE 200 may transmit a message including the time reference to a network node 300 (Block 410). Optionally, the UE 200 may also transmit an indicator to the network node 300 indicating a difference between typical and non-typical interference levels (Block 412). For example, the report may indicate whether the interference was above one or more predefined thresholds. For example, the report may include one bit, where a '0' indicates a high level of non-typical interference and a '1' indicates a severely high level of non-typical interference. In some embodiments, the report may indicate an absolute level of interference, while in other embodiments the report may indicate a relative level of interference, such as a level of interference relative to a received signal power, a baseline signal power, or some other reference. The number of bits used for the report may depend on the type of resources the indicator is sent on. For example, more bits may be used when the indicator is sent using a scheduled resource compared to a situation where the indicator is sent, for example, using an uplink control channel which may allow faster signaling but with fewer available resources.

Figure 5:
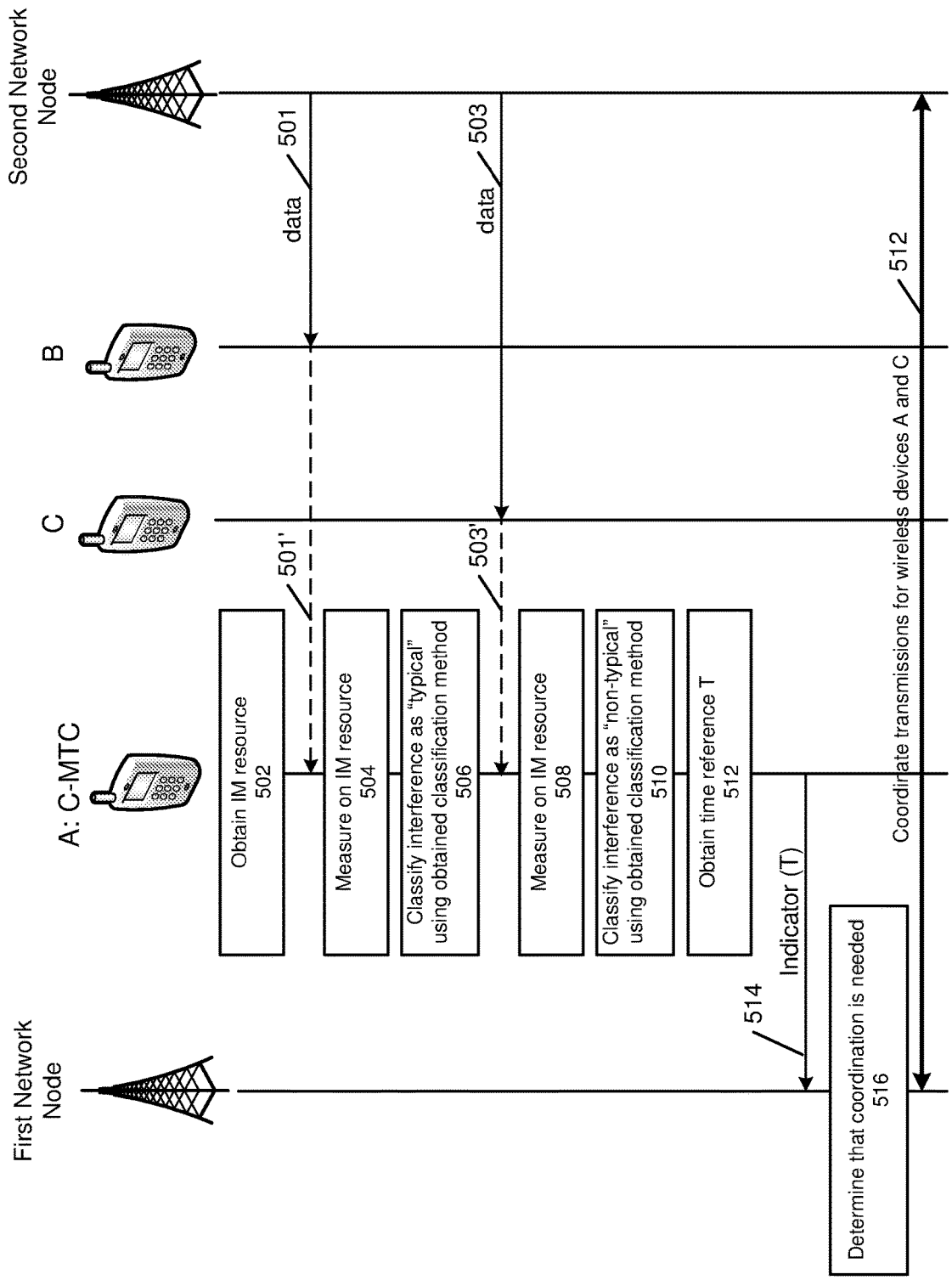
FIG. 5 is a flow diagram illustrating operations of systems/methods according to an example.

An example of operations according to some embodiments is illustrated in FIG. 5. In the system of FIG. 5, a first network node serves a C-MTC wireless device A and a second network node serves two wireless devices B and C, which may or may not be C-MTC devices. The network nodes beam-form the transmissions to the served wireless devices.

The C-MTC wireless device A, which may be a UE 200, obtains an IM resource (Block 502). Meanwhile, the second network node transmits a communication 501 to wireless device B. Some of the energy from the transmission reaches the wireless device C as interference 501'. The wireless device C measures interference on the IM resource (Block 504), and classifies the measured interference 501' as either typical or non-typical (Block 506). In this example, the interference 501' is classified as typical.

The second network node also transmits a communication 503 to the wireless device B. Some of the energy from the transmission reaches the wireless device C as interference 503'. The wireless device C measures interference on the IM resource (Block 508), and classifies the measured interference 503' as either typical or non-typical (Block 510). In this example, the interference 503' is classified as non-typical.

Because the interference 503' was classified as non-typical, the UE obtains a time reference T associated with the interference 503' (Block 512) and transmits an indicator 514 including the time reference T to the first network node (which is serving the wireless device C). The indicator 514 indicates to the first network node that the wireless device C is experiencing non-typical interference associated with the time reference T.

In response to receiving the indicator 514, the first network node communicates (512) with the second network node to coordinate transmissions for wireless devices A and C in an effort to reduce the impact of the non-typical interference 503'. For example, in some embodiments, the first and second nodes may decide to coordinate transmissions to the wireless devices A and C such that transmissions to the devices do not occur during the same time intervals. In other embodiments, the first and second nodes may decide to coordinate transmissions to the wireless devices A and C such that transmissions to the devices use frequencies that are separated by a predetermined frequency difference.

Dynamic TDD and Flashlight Interference

Some embodiments apply to the detection of non-compatible UEs for dynamic TDD and large antenna beam-forming deployments. For dynamic TDD, the problem is that an uplink (UL) UE transmission can cause interference to a downlink (DL) UE reception. In the beam-forming case, a UE may experience "flash-light" type interference. For example, for a MIMO transmission using 64 fixed DFT beams with an oversampling factor of 1, there is roughly 2% chance that the beam will illuminate another user in a neighbor cell. In the dynamic TDD case, two UEs are assumed to be typically well isolated, for example, due to UL beam-forming and the presence of houses etc., blocking any direct leakage between users. Both of these scenarios may be characterized in that, by pure chance, most users are not causing any interference to each other.

According to some embodiments, UEs can monitor a low overhead CSI-IM resource to detect unexpected interference. In an example illustrated in FIGS. 6A (flashlight case) and 6B (Dynamic TDD), there are 10 UEs (A1, A2, . . . , A10; B1, B2, . . . , B10) per cell being served by base-station nodes A (BS A) and B (BS B), respectively. In this example, UE A1 and UE B1 are not compatible, i.e., transmissions to/from UE B1 may cause non-typical interference at UE A1. According to some embodiments, UE A1 may perform low-overhead IM measurements over 7 sub-frames (TTI 0 to TTI 6). The UE A1 may detect non-typical interference in sub-frames TTI 1 and TTI 3 as a result of transmissions to/from UE B1 (indicated by check marks). The UE A1 may send this information in a report with the two detected time-instances. In this example UE A1 measures in DL subframes for Node A. That is, the UE A1 monitors DL sub-frames for unexpected interference. In the flash-light case (FIG. 6A), the detection is of B1 DL transmissions and in Dynamic-TDD (FIG. 6B) it is B1 UL transmissions that trigger a detection of high interference.

Also note that the unexpected interference in TTI 3 could potentially have resulted in transmission of a HARQ-NACK by UE A1 (since UE A1 is scheduled in TTI 3). However, the network would not know if this NACK was due to non-typical interference or due to a normal failed decoding (NACK only indicates a decoding failure; not how much interference was received). Further, given that both TTI 1 and 3 had non-typical interference, the network can conclude that the interference is due to UE B1, and can thus avoid scheduling A1 in the same sub-frames as B1, either in the DL for the flash-light interference case or in DL together with B1 in UL for dynamic TDD. Hence some embodiments also enable detection with a coordinated multi-point (CoMP) feature.

In some embodiments, the base station nodes A and B may perform a scheduling restriction to also avoid the cause of the non-typical interference, e.g. scheduling A1 contemporaneously with B1. Observe that in this example there is a failed transmission in TTI 3, which is not always allowed. In particular, for a C-MTC UE, the high reliability requirement may make it mandatory to monitor at least one sub-frame with the set of UEs that should be co-scheduled with the C-MTC UE prior scheduling. Previously, for C-MTC services co-scheduling any other users is typically avoided. That is, by using embodiments described herein, the network can estimate the risk of co-scheduling a set of UEs with the C-MTC UE. Hence, some embodiments can be utilized pro-actively to determine non-suitable co-scheduled UEs.

A further observation is that the trial (pro-active detection) should be close in time to the actual co-scheduling of C-MTC data so that fading will not change significantly between the monitored TTI and the co-scheduled TTI. Thus, a fast, low overhead report, for example, a list or bit-map of the latest 8 DL sub-frames or similar low overhead signaling, may be preferable.

Operation of Network Node

Figure 7:
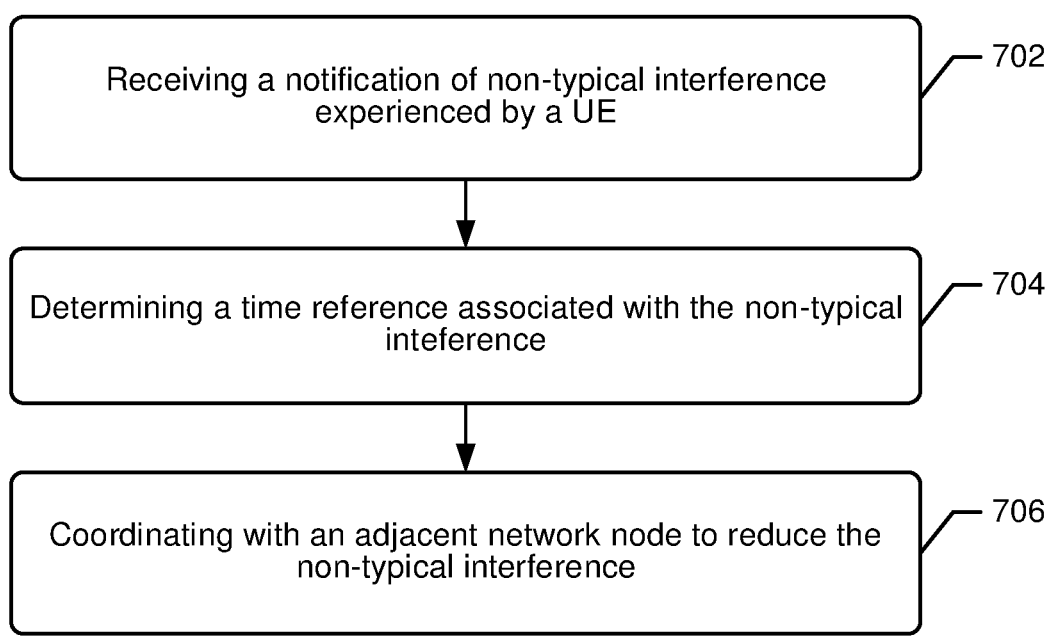
FIG. 7 is a flowchart of operations and methods that can be performed by a network node according to some embodiments of inventive concepts.

FIG. 7 is a flowchart illustrating operations of a network node 300 according to some embodiments. Referring to FIG. 7, a network node 300 that serves a UE 200 may receive a notification from the UE 200 that the UE has experienced non-typical interference (Block 702). The network node 300 determines a time reference T associated with the non-typical interference (Block 704). The network node 300 then coordinates with an adjacent network node 300 to reduce the non-typical interference that is being experienced by the UE 200 (Block 706). For example, the network node 300 may coordinate with the adjacent network node 300 to identify a transmission to/from a UE 200 served by the adjacent network node 300 that is causing the non-typical interference, and coordinate so that the UE 200 and the UE 200 served by the adjacent network node 300 are scheduled in different sub-frames. That is, the network node 300 may change the scheduling of resources allocated to the UE 200 served by the network node 300 or the scheduling of resources allocated to the UE 200 served by the adjacent network node 300 in coordination with the adjacent network node 300. Changing the resources allocated to a UE 200 may include changing a frequency used by the UE 200 and/or a TTI used by the UE 200.

Examples of Modules for Network Nodes and UEs

Figure 8:
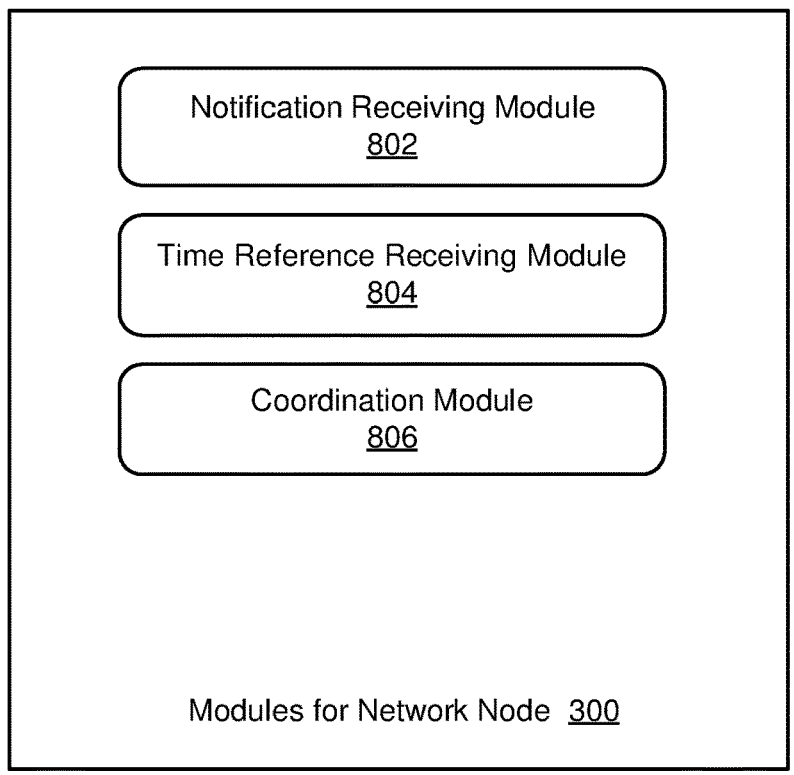
FIG. 8 illustrates modules for a network node that perform operations as disclosed herein according to some embodiments.
Figure 9:
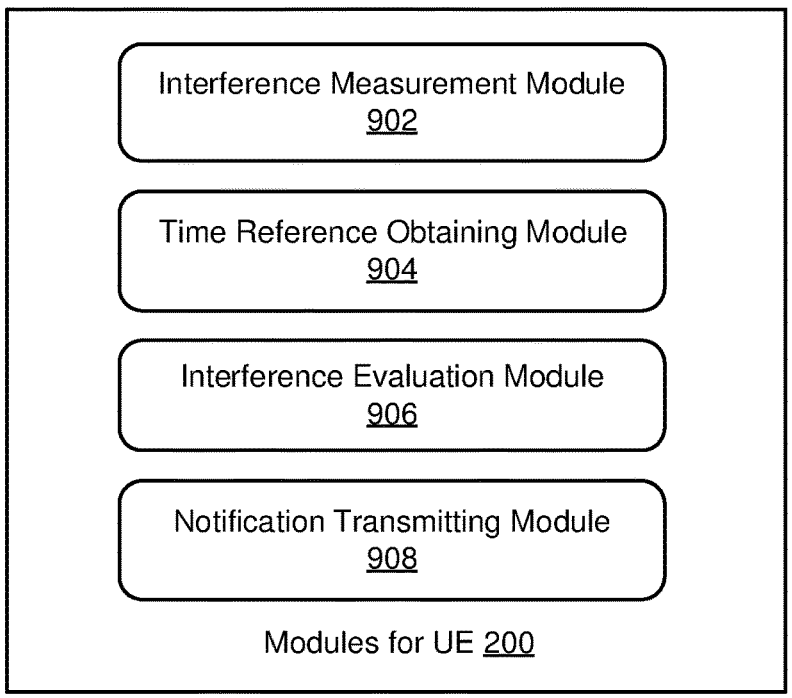
FIG. 9 illustrates modules for a UE that perform operations as disclosed herein according to some embodiments.

FIG. 8 illustrates an example of modules for a network node 300, while FIG. 9 illustrates an example of modules for a UE 200. Referring to FIG. 8, a network node 300 may include a notification receiving module 802 for receiving a notification from a UE 200 served by the network node 300 that the UE 200 is experiencing non-typical interference. The network node 300 may further include a time reference receiving module 804 for receiving from the UE 200 a time reference associated with the non-typical interference. The network node 300 may further include a coordination module 806 for coordinating with an adjacent network node to reduce the impact of the non-typical interference at the UE 200.

Referring to FIG. 8, a UE 200 may include an interference measurement module 902 for performing an interference measurement using an IM resource. The UE 200 may further include a time reference obtaining module 904 for obtaining a time reference associated with the measured interference. The UE 200 may further include an interference evaluation module 906 for classifying the measured interference as typical or non-typical. Finally, the UE 200 may include a notification transmitting module 908 for transmitting a notification of non-typical interference to a network node 300 that is serving the UE 200.

Identifying Non-typical Interference Properties

An example of a short measurement period in which it is possible to identify the interfering UE is described above. However, in some scenarios, there are more measurements available and/or the instances of non-typical interference may not be caused by the same interference situation. In these scenarios, there is a need for additional help in the identification process of the cause of the interference. In such an embodiment, the UE can, in the non-typical interference report, also include spatial information about the non-typical interference.

Figure 10:
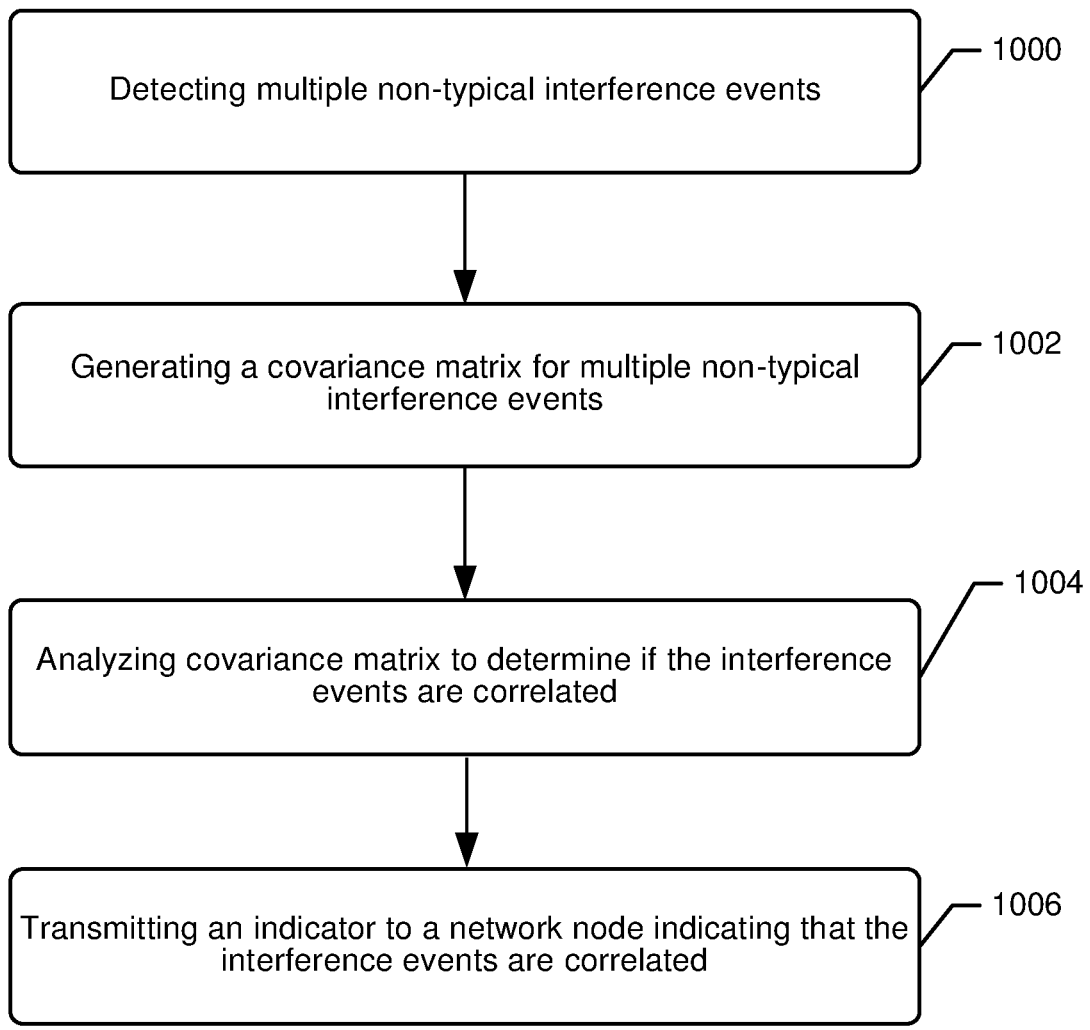
FIG. 10 is a flowchart of operations and methods that can be performed by a UE according to some embodiments of inventive concepts.

In some embodiments, this spatial information can be a covariance matrix of the experienced interference. Referring to FIG. 10, in some embodiments the UE 200 detects multiple occurrences of non-typical interference (Block 1000). The UE 200 generates a covariance matrix for the multiple non-typical interference events (Block 1002), analyzes the covariance matrix to determine if the interference events are spatially correlated (Block 1004), and if so, sends an indicator in the report indicating that the interference events are spatially correlated (Block 1006). The UE can, for example determine if the multiple covariance matrices are spatially correlated or non-correlated, for example, by calculating the singular value decomposition (SVD) for the multiple matrices and correlating the eigenvectors corresponding to the sufficiently large eigenvalues (i.e. only a set of eigenvalues such that the interference from said set would be classified as non-typical). This correlation indicator between multiple measurements can be single bit or multiple bits representing different levels of correlation and/or correlation between one or multiple eigenvectors.

Handover Identification from Non-Typical Interference Indication

The identification of stronger than typical interference situations can be used by the network to pin point specific transmit beamforming patterns in the network that are especially harmful for the UE of interest.

In some embodiments, the knowledge about a strong interfering beam from a non-serving transmission point can be used as indication of a suitable handover candidate beam. A signal that is a strong interferer could potentially also be a good signal for carrying desired data. In this mode of operation, the invention is used for initiating mobility procedures using the identified interfering beam as beamformer for a mobility reference signal.

Figure 11A:
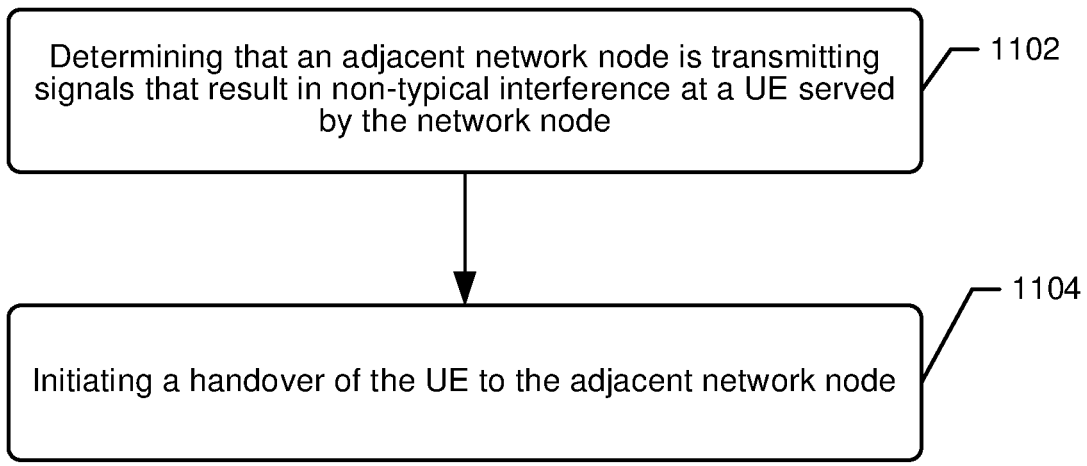
FIGS. 11A and 11B are flowcharts of operations and methods that can be performed by a network node according to some embodiments of inventive concepts.
Figure 11B:
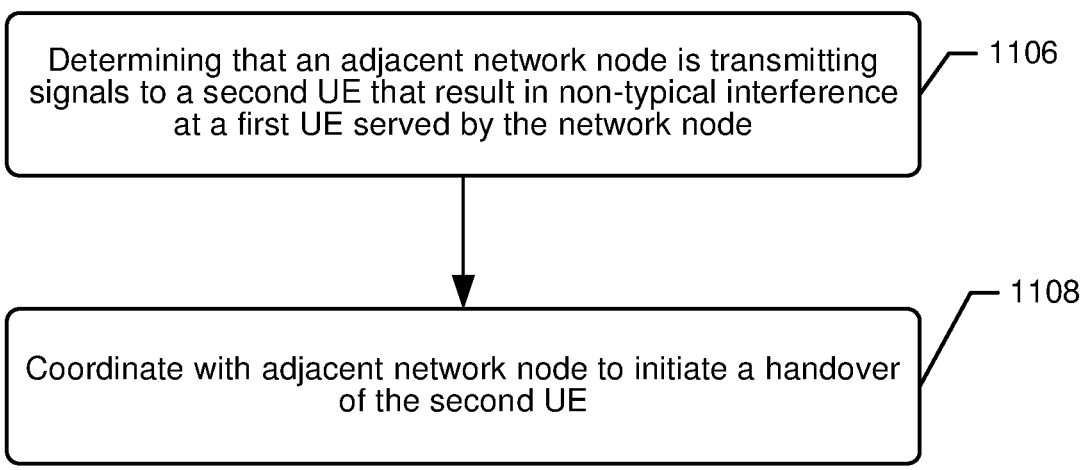

Operations of a network node 300 according to some embodiments are illustrated in FIGS. 11A and 11B. Referring to FIG. 11A, a network node 300 determines that an adjacent network node is transmitting signals that result in non-typical interference at a UE 200 served by the network node 300 (Block 1102), and, in response, initiates a handover of the UE 200 to the adjacent network node (Block 1104).

In some embodiments, the network node 300 may coordinate with the adjacent network node to initiate a handover of the UE that is receiving the signals that are causing the non-typical interference at the UE 200. For example, referring to FIG. 11B, a network node 300 determines that an adjacent network node is transmitting signals to a second UE that result in non-typical interference at a UE 200 served by the network node 300 (Block 1106). In response, the network node 300 coordinates with the adjacent network node to initiate a handover of the second UE (Block 1108). The second UE may be handed over to the network node 300 or another available network node.

Identification of Good Blanking Candidates

In some embodiments, the non-typical interference is a lower than average interference level. This type of interference indication could facilitate the indication of good transmission point blanking candidates for a specific UEs by analyzing if there are any transmission points that are silent on the time instances where the lower than average interference level was observed. The network could then apply these blanking patterns when transmitting data to the UE of interest, or in a more stepwise approach the network could initiate CSI measurements to further assess the impact of interference from the aggressor transmission point on the UE throughput.

Signaling of Non-Typical Interference Indication

In some embodiments, it is preferable that a non-typical interference report is transmitted with a short delay. This means that for some embodiments it is not suitable to transmit the non-typical interference report in a RRC measurement report. In some cases, a more suitable solution is to transmit the non-typical interference report in a MAC control element or as an L1 message (e.g., UCI).

Application to New Radio

In New Radio (NR), there are numerous targeted scenarios in which proper interference estimation is needed. Many of these situations have the same or similar characterization as typical LTE scenarios. As a consequence, the interference measurement procedures for these types of scenarios are also needed in NR. Identifying how to carry over these functions without violating the NR design goals is a subject of discussion and investigation.

One of the main NR design goals is to give better support for larger antenna arrays, both to achieve higher antenna gain for coverage and to support higher order MU-MIMO. A target number is to support up to 256 TX-chains at the BS. One significant benefit of using MU-MIMO is that the system can be more flexible in the number of scheduled users where each user can be assigned a large bandwidth while co-scheduling other users. Traditionally, MU-MIMO has been challenging due to the fact that it required a good choice of co-scheduled users to lessen the interference impact of additional MU-MIMO scheduling.

Another change in NR is that the target scenarios are very wide. For example, some critical services need very low error rate targets. This fact, together with the large antenna case, introduces additional requirements on the interference estimation procedures in NR.

In LTE, the CRS has been used as one component in the interference estimation process, and there is a need to define whether and how these measurements are to be performed in NR. This type of cell-specific measurement is needed as long as a significant source of interference is of this type.

One of the design goals for NR is to remove "always on" signals and reduce broadcast transmissions of system information. Hence, as long as data and control channels are designed to be UE-specific, the need for this type of interference measurement is limited. In the case of beam-based operation, an option is to configure CSI-RS for beam measurements that can serve the same purpose if needed.

With respect to NR, the goals of minimizing "always on" broadcast transmissions and using UE specific DMRS limit the need for cell type measurements and increase the need for UE specific measurements. The current CSI-RS LTE measurement framework may be used for LTE-like deployments with a limited number of RX/TX chains. However, in NR the configuration of the CSI-RS measurements needs much greater flexibility than is needed in LTE, due to new use cases, coexistence between services, deployment in unlicensed spectrum, dynamic TDD, etc. As a result, NR needs more dynamic and more flexible assignments of measurements on CSI-RS resources compared to the LTE framework.

For NR deployments, it is useful to consider what happens when the number of RX/TX chains are increased at both the base-station and the UE.

For beam-formed transmissions, the impact of any DL transmission is dependent upon the UE specific beam-forming, e.g. a system using 8 TX-chains has a 9 dB beam-forming gain, which is sufficient to handle strong variations in interference. Further, DL-power control is one important feature that could change the interference characteristic compared to LTE, and can further increase the interference power variations. That is, measuring only the path-gain is not very helpful in the interference estimation. Rather, measuring the effective average interference is better and can be captured using measurements on ZP CSI-RS.

In addition, an increased number of RX-chains in the UE means that strong spatial filtering can reduce interference. The effectiveness of this filtering depends on the characteristics of the interference. To estimate the interference impact, an explicit hypothesis of the interference or beam-formed CSI-RS is needed. But with more co-scheduled users and more antennas tracking all such cases, it is typically not feasible due to complexity and channel decorrelations, etc.

When the number of TX and RX antennas increases and the number of MU-MIMO users increases, tracking all interference situations with NZP CSI-RS may not be feasible. However, it is observed that the UE side interference suppression still needs a pre-equalizer SINR that is sufficient for the channel estimation to work properly. Thus, there is still a need to track the general pre-equalizer SINR and detect unexpectedly high interference that hinders channel estimation.

Instead of spending energy on tracking interference, it is observed that when the number of transmit antennas is increased and UE specific beam-forming is used, good transmitter CSI will increase signal power while the total interference power is more or less fixed, as long as the interference is non-coherently added, i.e., if the channels are uncorrelated. In some heterogeneous deployments, this situation can be different when some nodes do not have a large number of antennas, which may require additional investigations.

Improving CSI used for transmitter beam-forming may increase signal power without adversely affecting the interference. Thus, it is desirable to provide good CSI for transmit-beamforming in NR. Good CSI will also lower intra-cell interference if advanced beam-forming techniques such as null-forming are used.

The general interference level is quite UE-specific in the DL, even with a moderate number of TX antennas. For example, UEs with low DL power can be sensitive to interference from high power DL transmissions. Unexpectedly high interference could also be due to dynamic TDD operation, in-band self-backhauling etc. But clearly even if only the TX impact of more antennas doing interference measurements is considered, UE specific interference measurement/mitigation has a scaling problem, as there are very many more UEs than base-stations.

ZP CSI-RS can be used to detect both the general interference level and unexpected flash-light type interference. Thus, for the cases in which a UE experiences flash-light like interference, is important to detect such interference so that it can be taken into account in link adaptation. In a single sub-frame, there are typically not that many UEs actively transmitting. Thus, after the fact, the interference can be tracked when CSI-RS measurements are limited to the set of candidate UEs. For this set, it is possible to use LTE-like techniques for interference measurements. Hence, there is a need to address the problem of how to enable detection of non-typical interference, and then use standard LTE techniques to address such non-typical interference. In reciprocity operation, another cause of unexpected interference can be pilot contamination on SRS measurements.

Either NZP CSI-RS or DMRS can be used to identify the cause of unexpected interference, e.g. flash-light interference, dynamic TDD and pilot-contamination problems.

Another distinction is how NR should use interference measurements in scheduled data transmissions in relation to data transmission opportunities. In the case of measurements on data, DMRS is available both for the channel estimation and also for the co-scheduled transmissions. The use of NZP CSI-RS can provide additional measurements on users that are not co-scheduled for interference measurements, but may give better transmitter CSI that is not covered by current DMRS. The focus on transmitter CSI is also important, as unless non-scheduled UEs are configured/signalled with available measurement resources, they are not aware of available resources and thus cannot perform measurements.

In non-scheduled sub-frames NR UEs might not be aware of available measurement resources. The fact that interference is very sub-frame specific implies that having flexible and specific measurements of the interference in time and frequency is important, particularly for larger bandwidths where interference become more frequency selective. Hence, performing any filtering on the interference measurements may hide the cause of strong non-typical interference and may hinder both detection and identification of such interference. On the other hand, when capturing the average interference in more LTE like scenarios, filtering can be efficient to improve reporting quality and lower overhead.

The best choice of filtering on CSI measurements is scenario and implementation dependent. An additional component in CSI measurements is the differentiation in the service requirements. For mobile broadband (MBB) services, the LTE specification clarifies that the UE evaluation procedure should aim for a block error rate (BLER) of 10%. Hence, adopting the same approach in NR and disregarding rare error events for mobile broadband, a higher throughput could be achieved by sending more data in the remaining 90% of the transmission opportunities. Consider for example when a UE is in the coverage border to an uncoordinated neighbour using 1 out of 32 beams, then the approximate interference hit rate is around 3%.

If high interference is rare (<<10% probability) this is not very harm-full for MBB as long as the system can detect and react to such interference situations. It may be more efficient to detect rare error events using fast HARQ feedback.

Another aspect for the interference measurements is to maintain future compatibility. In particular, interference measurement resources should neither interfere with co-scheduled future services, nor should it be required to pollute CSI-RS measurements for legacy NR devices when new services are introduced into NR.

For future compatibility, it is important to be able to contain CSI-RS within a well-defined resource. In the case of critical services, the error requirements are much stricter. The system cannot react to an error event, as error events are not allowed from a service quality point of view. It may potentially be needed to accept the cost of using dedicated resources for critical services due to sensitivity to interference, unless the effect of interference could be observed in advance. Hence observability of interference over a larger set of resources could be needed to guarantee error free operation.

For critical services, good observability of a large set of radio resources and interference conditions are needed. This means that the system should support extensive measurements and possibly extensive reporting over an extended measurement resource outside of resources scheduled for data. Long term measurements are needed to support for services with low error requirements and improved link adaptation.

To address the issues described above, the following embodiments are provided.

In some embodiments, no additional measurement signal may be introduced to substitute for CRS measurements. Instead, CSI-RS are configured for beam measurements when needed.

In some embodiments, the LTE CSI-RS framework is used as a baseline for NR CSI-RS design with the addition of resource element mappings. For MBB services, some embodiments may use ZP CSI-RS as a baseline interference measurement resource.

Some embodiments may provide a lean interference measurement framework and/or may enable fast detection of non-expected interference.

Some embodiments provide selective interference measurements on either NZP CSI-RS or DMRS.

In some embodiments, CSI-RS may be configured within the data transmission resources, and CSI-RS may be dynamically scheduled with the data transmissions.

Some embodiments enable configurable filtering on CSI-RS, where one such configuration is one-shot CSI-RS measurements.

For a large number of antennas, the focus on CSI measurements should be to get high quality transmitter CSI.

LISTING OF EMBODIMENTS

Embodiment 1

A method of operating a UE comprising:
obtaining (400) an interference measurement (IM) resource;
performing (402) an interference measurement using the IM resource;
obtaining (404) a time reference associated with the interference measurement;
determining (406) that the interference measurement represents a non-typical level of interference; and transmitting (410) an indicator indicating the time reference to a network node.

Embodiment 2

The method of Embodiment 1, wherein the IM resource comprises a time-frequency IM resource.

Embodiment 3

The method of Embodiment 1, wherein the IM resource comprises a channel state information interference measurement (CSI-IM) resource.

Embodiment 4

The method of Embodiment 3, wherein the IM resource comprises a zero power (ZP) CSI-RS resource.

Embodiment 5

The method of Embodiment 1, wherein the time reference comprises a transmission time interval associated with the interference measurement.

Embodiment 6

The method of Embodiment 1, further comprising transmitting (412) an indicator indicating a difference between non-typical and typical interference to the network node.

Embodiment 7

The method of Embodiment 1, wherein non-typical interference comprises interference associated with a metric that is compared to a threshold.

Embodiment 8

The method of Embodiment 7, wherein the metric comprises a signal to interference ratio (SIR), a signal to interference plus noise ratio (SINR) and/or a bit error rate (BER).

Embodiment 9

The method of Embodiment 1, wherein non-typical interference comprises interference greater than an average level of interference.

Embodiment 10

The method of Embodiment 1, further comprising:
detecting (1000) multiple occurrences of non-typical interference;
generating (1002) a covariance matrix for the multiple occurrences of non-typical interference;
analyzing (1004) the covariance matrix to determine if the multiple occurrences of non-typical interference are correlated; and transmitting (1006) an indicator to the network node indicating that the multiple occurrences of non-typical interference are correlated.

Embodiment 11

The method of Embodiment 1, wherein non-typical interference comprises interference at a level that causes the UE to saturate.

Embodiment 12

A computer program product comprising a non-transitory computer readable medium storing program code that when executed by a processor of the UE (200) causes the UE (200) to perform operations of the method of any of claims 1 to 11.

Embodiment 13

A UE (200) adapted to perform the method of any of claims 1 to 11.

Embodiment 14

A UE (200) comprising:
a transceiver (201);
at least one processor (203) coupled to the transceiver (201); and at least one memory (205) coupled to the at least one processor (203) and storing program code that when executed by the at least one processor (203) causes the at least one processor (203) to perform operations comprising:
obtaining (400) an interference measurement (IM) resource;
performing (402) an interference measurement using the IM resource;
obtaining (404) a time reference associated with the interference measurement;
determining (406) that the interference measurement represents a non-typical level of interference; and
transmitting (410) an indicator indicating the time reference to a network node.

Embodiment 15

A UE (200) comprising:
an interference measurement module 902 for obtaining (400) an interference measurement (IM) resource and performing (402) an interference measurement using the IM resource;
a time reference obtaining module 904 for obtaining (404) a time reference associated with the interference measurement;
an interference evaluation module 906 for determining (406) that the interference measurement represents a non-typical level of interference; and
a notification transmitting module for transmitting (410) an indicator indicating the time reference to a network node.

Embodiment 16

A method of operating a network node (300) of a cellular radio access network, RAN, the method comprising:
receiving (702) a notification of non-typical interference experienced by a user equipment (UE);
determining (704) a time reference associated with the non-typical interference; and coordinating (706) with an adjacent network node to reduce a level of the non-typical interference.

Embodiment 17

The method of Embodiment 16, wherein coordinating with the adjacent network node to reduce a level of the non-typical interference comprises changing scheduling of resources allocated to the UE.

Embodiment 18

The method of Embodiment 16, further comprising:
determining (1102) that the adjacent network node is transmitting signals that result in the non-typical interference at the UE; and
initiating (1104) handover of the UE to the adjacent network node.

Embodiment 19

A computer program product comprising a non-transitory computer readable medium storing program code that when executed by a processor of the network node (300) causes the network node (300) to perform operations of the method of any of claims 16 to 18.

Embodiment 20

A network node (300) adapted to perform the method of any of claims 16 to 18.

Embodiment 21

A network node (300) comprising:
a transceiver (301);
at least one processor (303) coupled to the transceiver (301); and
at least one memory (305) coupled to the at least one processor (303) and storing program code that when executed by the at least one processor (303) causes the at least one processor (303) to perform operations comprising:
receiving (702) a notification of non-typical interference experienced by a user equipment (UE);
determining (704) a time reference associated with the non-typical interference; and
coordinating (706) with an adjacent network node to reduce a level of the non-typical interference.

Embodiment 22

A network node (300) comprising:
a notification receiving module for receiving (702) a notification of non-typical interference experienced by a user equipment (UE);
a time reference receiving module (804) for determining (704) a time reference associated with the non-typical interference; and
a coordination module (806) for coordinating (706) with an adjacent network node to reduce a level of the non-typical interference.

Abbreviations and Explanations:
ACK Acknowledged
ADC Analog-to-digital conversion
AGC Automatic gain control
ANR Automatic neighbor relations
AP Access point
BCH Broadcast channel
BLER Block error rate
BS Base station
BSC Base station controller
BTS Base transceiver station
CA Carrier aggregation
CC Component carrier
CG Cell group
CGI Cell global identity
C-MTC Critical machine-type communications
CoMP Coordinated multi-point
CP Cyclic prefix
CPICH Common pilot channel
CQI Channel Quality Indicator
CSG Closed subscriber group
CSI Channel State Information
DAS Distributed antenna system
DC Dual connectivity
DFT Discrete Fourier Transform
DL Downlink
DL-SCH Downlink shared channel
DMRS Demodulation Reference Signal
DRX Discontinuous reception
EARFCN Evolved absolute radio frequency channel number
ECGI Evolved CGI
eNB eNodeB
FDD Frequency division duplex
FFT Fast Fourier transform
HARQ Hybrid automatic repeat request
HD-FDD Half duplex FDD
HO Handover
IM Interference Measurement
LTE Long Term Evolution
M2M machine to machine
MAC Media access control
MCG Master cell group
MDT Minimization of drive tests
MeNB Master eNode B
MIMO Multiple input, multiple output
MME Mobility management entity
MRTD Maximum receive timing difference
MSR Multi-standard radio
MTC Machine-type communications
MU-MIMO Multi-user MIMO
NACK Not acknowledged
NR New Radio
NZP Non-zero power
OFDM Orthogonal frequency division multiplexing
RI Rank Indicator
SI System Information
SIB System Information Block
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Pre-coding Matrix Indicator
ProSe Proximity Service
PSCell Primary SCell
PSC Primary serving cell
PSS Primary synchronization signal
PSSS Primary Sidelink Synchronization Signal RAT Radio Access Technology
RF Radio frequency
RLM Radio link monitoring
RNC Radio Network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
SCC Secondary component carrier
SCell Secondary Cell
SCG Secondary Cell Group
SeNB Secondary eNode B
SFN System frame number
SGW Signaling gateway
SINR Signal to interference and noise ratio
SON Self-organizing networks
SSC Secondary serving cell
SSS Secondary synchronization signal
SSSS Secondary Sidelink Synchronization Signal
TA Timing advance
TAG Timing advance group
TDD Time division duplex
Tx Transmitter
UARFCN UMTS Absolute Radio Frequency Channel Number
UE User equipment
UL Uplink
V2X Vehicle-to-X
V2I Vehicle-to-Infrastructure
V2P Vehicle-to-Pedestrian
ZP Zero Power
Further Definitions and Embodiments:

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts.

What is claimed is:

1. A method of operating a user equipment ("UE") comprising:
   obtaining an interference measurement ("IM") resource;
   measuring an interference measurement using the IM resource;
   recording a time reference during which the interference measurement was measured;
   responsive to measuring the interference measurement using the IM resource, determining that the interference measurement represents a non-typical level of interference comprising interference greater than an average level of interference associated with the UE;
   responsive to determining that the interference measurement represents the non-typical level of interference, transmitting an indicator indicating the time reference to a network node and transmitting an indicator indicating a difference between the non-typical level of interference and a typical level of interference to the network node;
   detecting multiple occurrences of non-typical interference;
   generating a covariance matrix for the multiple occurrences of non-typical interference; and
   analyzing the covariance matrix to determine if the multiple occurrences of non-typical interference are spatially correlated; and
   the transmitting the indicator comprising transmitting a second indicator to the network node indicating that the multiple occurrences of non-typical interference are spatially correlated.

2. The method of claim 1, wherein the time reference comprises a transmission time interval during which the interference measurement was measured.

3. The method of claim 1, wherein the non-typical level of interference comprises an interference level in which a receiver of the UE saturates and causes a violation of a reliability requirement of the UE.

4. The method of claim 3, wherein a metric comprises at least one of a signal to interference ratio ("SIR"), a signal to interference plus noise ratio ("SINR"), and a bit error rate ("BER").

5. The method of claim 1, further comprising:
   measuring interference using the IM resource in a plurality of subframes;
   generating a list indicating subframes, of the plurality of subframes, in which non-typical levels of interference were measured; and
   transmitting the list to the network node.

6. The method of claim 5, wherein the list comprises a bit-map that indicates subframes in the plurality of subframes in which non-typical levels of interference were measured.

7. The method of claim 1, wherein the IM resource comprises a channel state information interference measurement ("CSI-IM") resource.

8. The method of claim 1, wherein the IM resource comprises a zero power ("ZP") channel state information reference signal ("CSI-RS") resource.

9. The method of claim 1, wherein the IM resource comprises a demodulation reference signal ("DMRS") resource.

10. A user equipment ("UE") comprising:
    processing circuitry; and
    memory coupled to the processing circuitry and having instructions stored therein that are executable by the processing circuitry to cause the UE to perform operations comprising:
      obtaining an interference measurement ("IM") resource;
      measuring an interference measurement using the IM resource;
      recording a time reference during which the interference measurement was measured;
      responsive to measuring the interference measurement using the IM resource, determining that the interference measurement represents a non-typical level of interference comprising interference greater than an average level of interference associated with the UE;
      responsive to determining that the interference measurement represents the non-typical level of interference, transmitting an indicator indicating the time reference to a network node and transmitting an indicator indicating a difference between the non-typical level of interference and a typical level of interference to the network node;

detecting multiple occurrences of non-typical interference;

generating a covariance matrix for the multiple occurrences of non-typical interference;

analyzing the covariance matrix to determine if the multiple occurrences of non-typical interference are spatially correlated; and the transmitting the indicator comprising transmitting a second indicator to the network node indicating that the multiple occurrences of non-typical interference are spatially correlated.

11. A method of operating a network node of a cellular radio access network ("RAN"), the method comprising:

receiving a notification of non-typical interference experienced by a user equipment ("UE");

receiving an indicator indicating that multiple occurrences of non-typical interference experienced by the UE are spatially correlated;

determining a time reference associated with the non-typical interference;

determining, based on the time reference, that an adjacent network node is transmitting signals that result in the non-typical interference at the UE; and responsive to receiving the notification and determining the time reference, initiating handover of the UE to the adjacent network node and coordinating, based on the time reference, with the adjacent network node to reduce a level of the non-typical interference.

12. The method of claim 11, wherein the UE comprises a first UE, and wherein coordinating with the adjacent network node to reduce the level of the non-typical interference comprises changing scheduling of resources allocated to a second UE that is causing the level of the non-typical interference at the first UE.

13. The method of claim 11, wherein the UE comprises a first UE, the method further comprising:

determining, based on the time reference, that the adjacent network node is transmitting signals to a second UE that result in the non-typical interference at the first UE; and initiating handover of the second UE away from the adjacent network node.

14. The method of claim 11, wherein coordinating with the adjacent network node to reduce the level of the non-typical interference comprises changing resources allocated to the UE.

15. A network node comprising:

processing circuitry; and memory coupled to the processing circuitry and having instructions stored therein that are executable by the processing circuitry to cause the network node to perform operations comprising:

receiving a notification of non-typical interference experienced by a user equipment ("UE");

receiving an indicator indicating that multiple occurrences of non-typical interference experienced by the UE are spatially correlated;

determining a time reference associated with the non-typical interference;

determining, based on the time reference, that an adjacent network node is transmitting signals that result in the non-typical interference at the UE; and responsive to receiving the notification and determining the time reference, initiating handover of the UE to the adjacent network node and coordinating, based on the time reference, with the adjacent network node to reduce a level of the non-typical interference.

16. A non-transitory computer readable medium having instructions stored therein that are executable by a processing circuitry of a user equipment ("UE") to cause the UE to perform operations comprising:

obtaining an interference measurement ("IM") resource;

performing an interference measurement using the IM resource;

obtaining a time reference associated with the interference measurement;

responsive to performing the interference measurement using the IM resource, determining that the interference measurement represents a non-typical level of interference comprising interference greater than an average level of interference associated with the UE;

responsive to determining that the interference measurement represents the non-typical level of interference, transmitting an indicator indicating the time reference to a network node and transmitting an indicator indicating a difference between the non-typical level of interference and a typical level of interference to the network node;

detecting multiple occurrences of non-typical interference;

generating a covariance matrix for the multiple occurrences of non-typical interference;

analyzing the covariance matrix to determine if the multiple occurrences of non-typical interference are spatially correlated; and the transmitting the indicator comprising transmitting a second indicator to the network node indicating that the multiple occurrences of non-typical interference are spatially correlated.

* * * * *